(12) United States Patent
Mineshita

(10) Patent No.: US 9,130,886 B2
(45) Date of Patent: Sep. 8, 2015

(54) COMMUNICATION SYSTEM, CONTROLLER, SWITCH, STORAGE MANAGING APPARATUS AND COMMUNICATION METHOD

(75) Inventor: Takashi Mineshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 14/126,390

(22) PCT Filed: Jun. 14, 2012

(86) PCT No.: PCT/JP2012/065190
§ 371 (c)(1),
(2), (4) Date: Dec. 13, 2013

(87) PCT Pub. No.: WO2012/173172
PCT Pub. Date: Dec. 20, 2012

(65) Prior Publication Data
US 2014/0112344 A1      Apr. 24, 2014

(30) Foreign Application Priority Data

Jun. 16, 2011      (JP) ................................. 2011-134425

(51) Int. Cl.
*G06F 3/14*      (2006.01)
*G06F 13/38*      (2006.01)
(Continued)

(52) U.S. Cl.
CPC ............ *H04L 45/745* (2013.01); *G06F 13/385* (2013.01); *H04L 45/38* (2013.01); *H04L 67/1097* (2013.01); *H04L 69/16* (2013.01); *H04L 69/22* (2013.01)

(58) Field of Classification Search
None
See application file for complete search history.

(56) References Cited

U.S. PATENT DOCUMENTS 6,925,533 B2 *   8/2005   Lewis ........................... 711/118
7,367,050 B2 *   4/2008   Mitsuoka et al. ................. 726/2
(Continued)

FOREIGN PATENT DOCUMENTS

CN        1289494 A       3/2001
JP     2004-164490 A      6/2004
(Continued)

OTHER PUBLICATIONS

English translation of PCT/ISA/237 (written opinion of the international searching authority, dated Sep. 11, 2012).
(Continued)

*Primary Examiner* — Jenee Williams
(74) *Attorney, Agent, or Firm* — McGinn IP Law Group, PLLC

(57) ABSTRACT

A communication system includes a server apparatus having an iSCSI initiator, a storage having an iSCSI target, a storage managing apparatus, an open flow controller and open flow switches. The storage managing apparatus stores route data of an iSCSI communication packet for every management ID determined based on an iSCSI initiator name and an iSCSI target name. The server apparatus transmits the iSCSI communication packet in which a management ID is stored in a destination port number. The open flow switch transfers the packet according to the entry. The open flow controller generates and distributes the entry to transfer the iSCSI communication packet to the open flow switch. A communication method is provided in which the flow control is carried out based on the iSCSI data without imposing a high load of the packet processing in the open flow switch by the communication system having the above-mentioned configuration.

6 Claims, 5 Drawing Sheets

(51) Int. Cl.
*H04L 12/721* (2013.01)
*H04L 12/741* (2013.01)
*H04L 29/08* (2006.01)
*H04L 29/06* (2006.01)

(56) References Cited

U.S. PATENT DOCUMENTS

| | | | | |
|---|---|---|---|---|
| 7,451,204 | B2* | 11/2008 | Shiga et al. | 709/223 |
| 7,586,942 | B2* | 9/2009 | Golasky et al. | 370/466 |
| 8,099,547 | B2 | 1/2012 | Amano et al. | |
| 8,135,918 | B1* | 3/2012 | Yueh | 711/147 |
| 8,180,928 | B2* | 5/2012 | Elzur et al. | 710/5 |
| 2003/0115447 | A1* | 6/2003 | Pham et al. | 713/153 |
| 2005/0281261 | A1* | 12/2005 | Zur et al. | 370/389 |
| 2005/0283545 | A1* | 12/2005 | Zur et al. | 710/36 |
| 2006/0109850 | A1 | 5/2006 | Otani et al. | |
| 2006/0218322 | A1* | 9/2006 | Hoese et al. | 710/62 |
| 2010/0082897 | A1 | 4/2010 | Amano et al. | |
| 2011/0261825 | A1 | 10/2011 | Ichino | |
| 2012/0257529 | A1 | 10/2012 | Ehara et al. | |

FOREIGN PATENT DOCUMENTS

| | | |
|---|---|---|
| JP | 2009-087179 A | 4/2009 |
| JP | 2010-79626 A | 4/2010 |
| JP | 2011-082834 A | 4/2011 |
| WO | WO 2010/103909 A1 | 9/2010 |

OTHER PUBLICATIONS

PCT/IB/373 dated Dec. 17, 2013.

Hiroshi Ueno, "A Study on Deployment of Network Appliance Functionalities on Datacenter Network", IEICE Technical Report, Japan, Institute of Electronics, Information and Communication Engineers, Nov. 13, 2009, vol. 109, No. 296, pp. 7-12.

Japanese Office Action dated Nov. 21, 2014 with a partial English translation thereof.

International Search Report in PCT/JP2012/060359 dated May 22, 2012 (English Translation Thereof).

"The OpenFlow Switch Consortium"<http://www.openflowswitch.org>/, searched on Sep. 9, 2010.

Extended European Search Report dated Apr. 21, 2015.

Chinese Office Action dated Jun. 17, 2015 with English translation.

Wei Xingjun, "Research and Implementation of Model and Pivotal Technology for OpenFlow Switch", Chinese Master's Theses, Full-Text Database Information Science and Technology, No. 5 May 15, 2015, I139-138.

* cited by examiner

Fig. 2

| MANAGEMENT ID 501 | INITIATOR IP ADDRESS | INITIATOR PORT NO. 502 | INITIATOR NAME 503 | TARGET PORT NO. 504 | TARGET NAME 505 | TARGET CONNECTION PORT 506 |
|---|---|---|---|---|---|---|
| 10 | 192.168.0.1 | 1500 | iqn.2000-01.com.nec:0123abcd | 3260 | iqn.2000-01.com.nec:01:xxxx-xx | 203-4 |
| 11 | 192.168.1.10 | 1700 | iqn.2000-01.com.nec:4567efgh | 3260 | iqn.2000-01.com.nec:02:xxxx-xx | 204-4 |
|  |  |  |  |  |  |  |
|  |  |  |  |  |  |  |

500: MANAGEMENT ID

COMMUNICATION SYSTEM, CONTROLLER, SWITCH, STORAGE MANAGING APPARATUS AND COMMUNICATION METHOD

TECHNICAL FIELD

The present invention is related to an open flow technique, and especially, an open flow control technique made based on data of iSCSI (Internet Small Computer System Interface).

BACKGROUND ART

The open flow is a communication technique which carries out a route control in units of flows. In the open flow, a "flow" is determined based on a combination of MAC addresses, IP addresses, and port numbers and so on. In the open flow technique, a route is not determined uniformly based on a source node and a destination node. In the open flow technique, a route can be changed between the source node and the destination node for every flow. Also, the route can be managed in an End-to-End system (between termination nodes) in addition to a system between the neighbor nodes. As a related art of the open flow technique, Non-Patent Literature 1 is known.

On the other hand, the demand of a high-speed large-capacity auxiliary storage apparatus is rising with the advance of a computer system. Especially, in case of handling a large-scale computer system, a configuration in which a storage (a disk array) as a set of storage apparatuses is connected with SAN (storage area network) is used in many cases. The iSCSI is well-known as a protocol using a SCSI (Small Computer System Interface) command through a network. The SAN using the iSCSI is commercially focused in a market to develop largely in the future from the viewpoint of a relatively cheap apparatus cost, and an effective use of an existing infrastructure.

As a related art in the SAN using the iSCSI, Japanese Patent Publication (JP 2004-164490A (Patent Literature 1)) is known. In JP 2004-164490A, a technique is disclosed in which the allocation of a storage to a host is carried out without changing the setting of a storage router, by using a virtual host identifier in the iSCSI storage system.

The SAN using the iSCSI uses TCP/IP (Transmission Control Protocol/Internet Protocol) in a lower layer of the SCSI. An open flow switch using the present open flow technique can handle only protocols up to the TCP layer in layer 4 in the OSI Reference Model. Because the iSCSI layer is in the layer 4 of the OSI Reference Model but is in an upper layer than the TCP layer, the iSCSI layer cannot be recognized by the open flow switch using the open flow technique. Therefore, the present open flow switch cannot control a flow by directly referring to SCSI names (iSCSI initiator name and iSCSI target name) of iSCSI layer data contained in the packet. The open flow switch which can handle data in the iSCSI layer is needed in order to realize the more flexible flow control.

CITATION LIST

[Patent literature 1] JP 2004-164490A

Non-Patent Literature

[Non-patent literature 1] "The OpenFlow Switch Consortium"<http://www.openflowswitch.org/>

SUMMARY OF THE INVENTION

An object of the present invention is to provide a communication method which carries out a flow control based on iSCSI data without imposing a heavy load of packet processing, in the open flow switch using the open flow technique.

A communication system of the present invention includes a server apparatus having an iSCSI initiator, a storage having an iSCSI target, a storage managing apparatus which manages the storage, an open flow controller which controls open flow switches, and the open flow switches which transfer a packet. The storage managing apparatus stores route data of an iSCSI communication packet for every management ID which is set based on an iSCSI initiator name and an iSCSI target name. The server apparatus transmits to the open flow switch, the iSCSI communication packet in which the management ID is stored in a destination port number field of a TCP header. The open flow switch transfers the iSCSI communication packet to the open flow controller when there is not an entry to the iSCSI communication packet in a flow table. When the open flow switch has an entry for the iSCSI communication packet in the flow table, the open flow switch transfers the packet according to the entry. When receiving the iSCSI communication packet, the open flow controller inquires about the route data corresponding to the management ID contained in the iSCSI communication packet, to the storage managing apparatus. The open flow controller generates an entry to transfer the iSCSI communication packet and distributes the entry to the open flow switches.

A communication method of the present invention is a method implemented by a communication system which includes a server apparatus having an iSCSI initiator, a storage having an iSCSI target, a storage managing apparatus which manages the storage, an open flow controller which controls open flow switches, and the open flow switches which transfer a packet. The storage managing apparatus stores route data of an iSCSI communication packet for every management ID determined based on an iSCSI initiator name and an iSCSI target name. The server apparatus transmits the iSCSI communication packet in which a management ID is written or stored, to the open flow switch. The server apparatus stores the management ID in the field of a destination port number of a TCP header. The open flow switch transfers the iSCSI communication packet to the open flow controller when there is not any entry for the iSCSI communication packet in a flow table. The open flow switch transfers the packet to according to the entry when there is an entry to the iSCSI communication packet in the flow table. When receiving the iSCSI communication packet, the open flow controller inquires about the management ID to the storage managing apparatus. When receiving the iSCSI communication packet, the open flow controller inquires about the route data corresponding to the management ID to the storage managing apparatus. The open flow controller generates an entry to transfer the iSCSI communication packet based on the result of inquiry of the route data. The open flow controller distributes the entry to the open flow switches.

According to the present invention, a communication method can be provided in which the open flow switch using an open flow technique carries out the flow control based on the iSCSI data without imposing a heavy load of packet processing.

BRIEF DESCRIPTION OF THE DRAWINGS

The above matters, and the other objects, and the features will become clear from the description of the exemplary embodiments of the present invention which will be made with the following drawings.

FIG. 2 is a diagram showing a storage management table managed by a storage managing apparatus 300 in the communication system 1 according to the exemplary embodiment of the present invention;

DESCRIPTION OF EXEMPLARY EMBODIMENTS

A communication system 1 according to exemplary embodiments of the present invention will be described below with reference to the attached drawings.

(Configuration)

Figure 1:
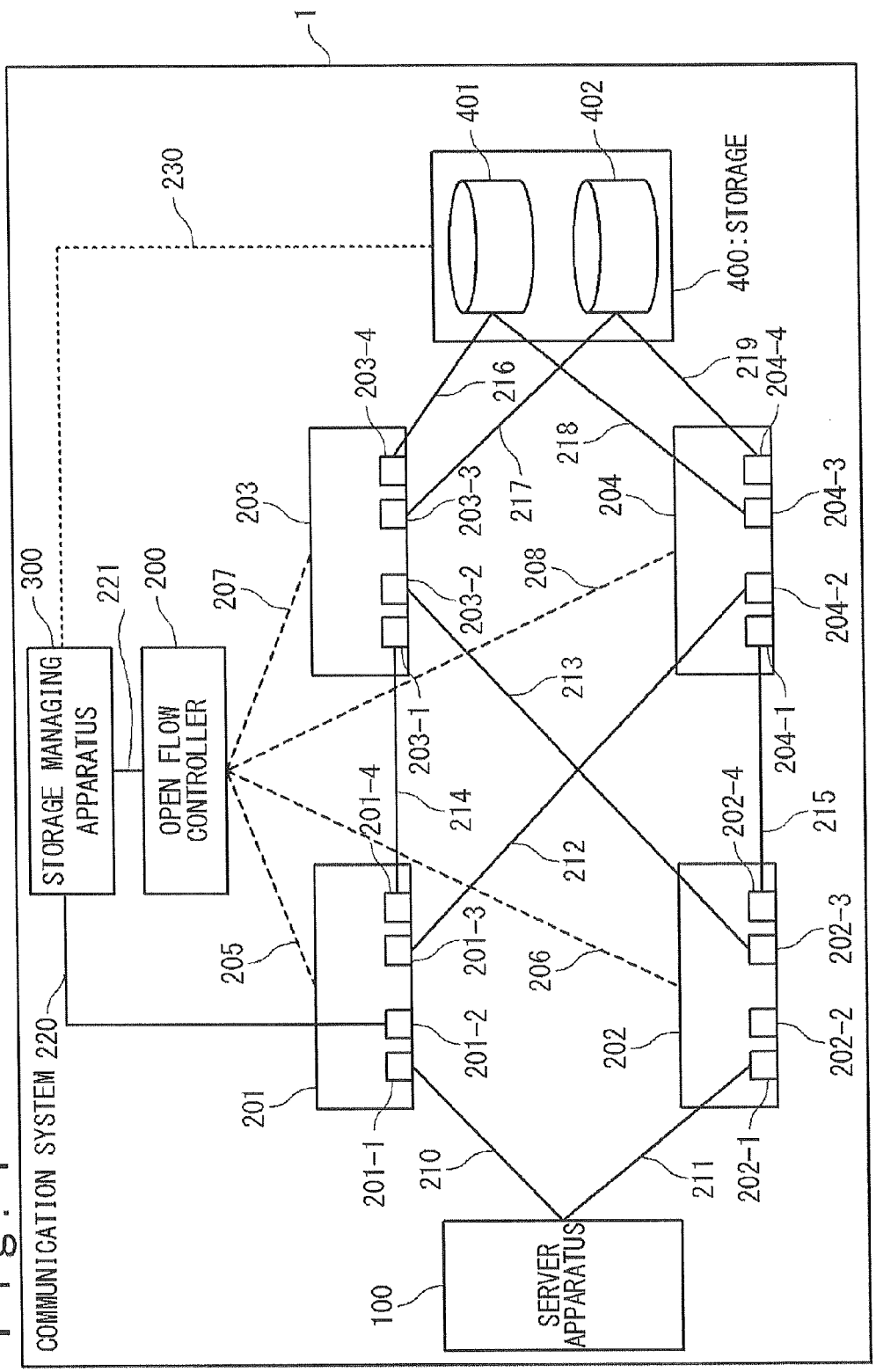
FIG. 1 is a diagram showing a network configuration of a communication system 1 according to an exemplary embodiment of the present invention.

First, the configuration of the communication system 1 of the present exemplary embodiment will be described. FIG. 1 is a diagram schematically showing the network configuration of the communication system 1 according to the exemplary embodiment of the present invention.

The communication system 1 of the present exemplary embodiment includes a server apparatus 100, an open flow controller 200 (hereinafter, to be referred to as an "OFC"), open flow switches 201 to 204 (hereinafter, to be referred to as "OFSs"), a storage managing apparatus 300 and a storage 400.

The server apparatus 100 includes an iSCSI initiator and communicates with iSCSI targets 401 and 402 of the storage 400 through the communication system 1.

The OFC 200 and the OFSs 201 to 204 are respectively connected with the communication paths 205 to 208. The OFC 200 sets a flow table for the flow control of the communication system 1 in the OFSs 201 to 204 by using the communication paths 205 to 208. Also, the OFC 200 and the storage managing apparatus 300 are connected by a communication path 221. The OFC 200 acquires from the storage managing apparatus 300 through the communication path 221, data for setting a flow entry to transfer an iSCSI communication packet.

The OFSs 201 to 204 are switches which transfer the packet on the communication system 1. The server apparatus 100 and the storage 400 are connected by communication paths 210 to 219 through the OFSs 201 to 204.

Software to manage the storage 400 is installed in the storage managing apparatus 300. The storage managing apparatus 300 and the storage 400 are connected by a communication path 230. The storage managing apparatus 300 carries out the transmission and reception of control messages to manage the storage 400 by using the communication path 230. Also, the storage managing apparatus 300 and the OFS 201 are connected by a communication path 220.

FIG. 2 shows a storage management table which is managed by the storage managing apparatus 300 in the communication system 1 according to the present exemplary embodiment of the present invention. The entry of the storage management table has fields of a management ID 500, an initiator IP address 501, an initiator port number 502, an initiator name 503, a target port number 504, a target name 505 and a target connection port 506 as attributes.

The management ID 500 is a numerical value which is uniquely determined based on a combination of the iSCSI initiator name and the iSCSI target name. The initiator IP address 501 is an IP address of an apparatus as the iSCSI initiator. The initiator port number 502 is a port number used by the apparatus as the iSCSI initiator for iSCSI communication. The initiator name 503 is an identifier which is assigned to an apparatus as the iSCSI initiator. The target port number 504 is a port number for the iSCSI target to carry out iSCSI communication. The target port number 504 is statically set by the storage managing apparatus 300. Or, the target port number 504 may be acquired through the communication path 230 from the iSCSI targets 401 and 402. The target name 505 is an identifier which is assigned to an apparatus as the iSCSI target. The OFS connected with the iSCSI target and a port of the OFS with which the iSCSI target is connected are stored in the field of the target connection port 506. The target connection port 506 is statically set by the storage managing apparatus 300 or is acquired through the communication path 230 from the iSCSI targets 401 and 402.

The iSCSI targets 401 and 402 exist in the storage 400. An identical IP address is assigned to the iSCSI targets 401 and 402. Each of the iSCSI targets uses "3260" as the TCP port number to carry out the iSCSI communication.

(Operation)

Figure 3:
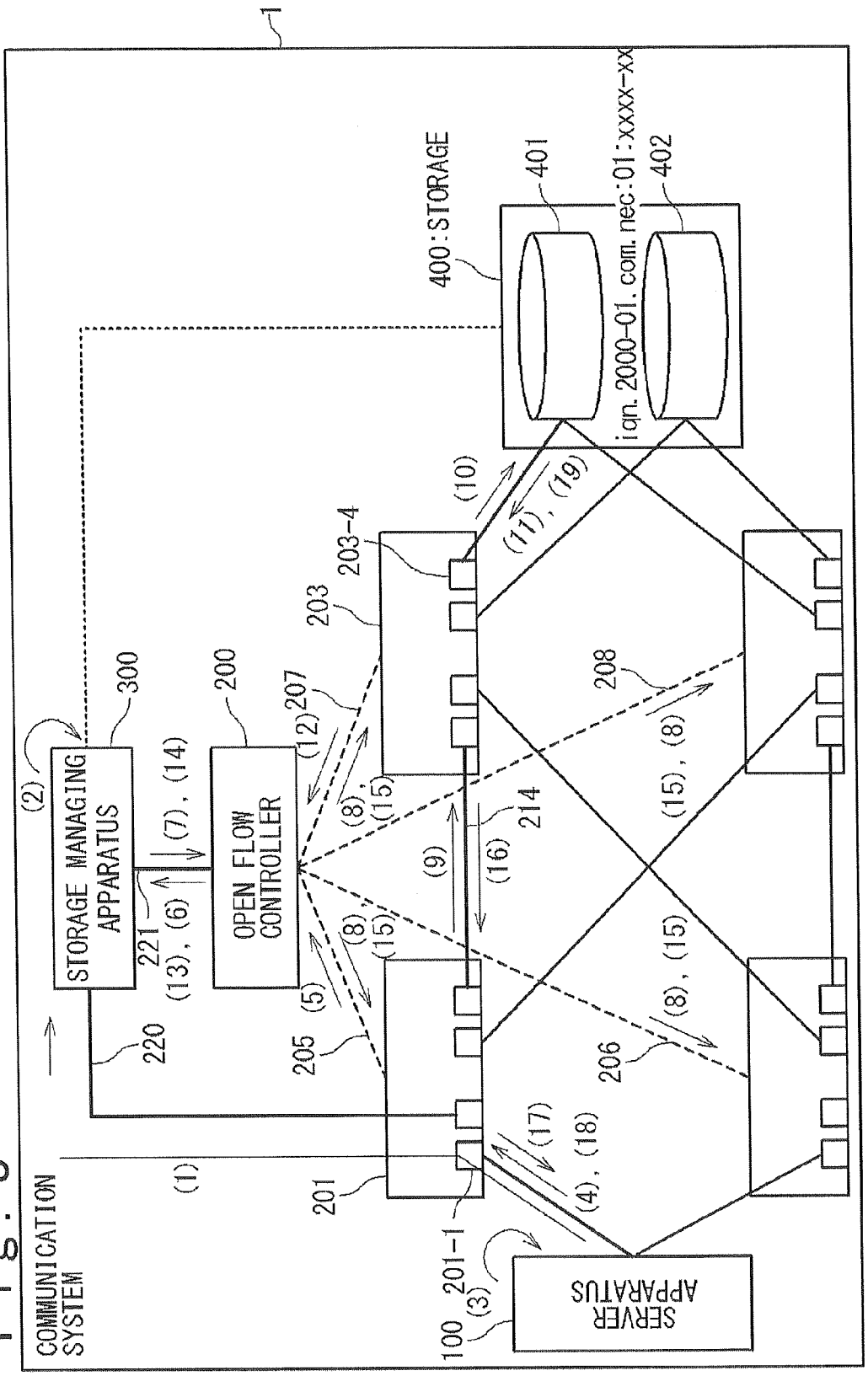
FIG. 3 is a diagram showing a communication method in the communication system 1 according to the exemplary embodiment of the present invention.

Next, a communication method of the communication system 1 of the present exemplary embodiment will be described. FIG. 3 is a diagram showing the communication method of the communication system 1 according to the present exemplary embodiment of the present invention. The iSCSI communication between the iSCSI initiator on the server apparatus 100 and the iSCSI target 401 on the storage 400 will be described as an example. It is supposed that the iSCSI communication between the iSCSI initiator on the server apparatus 100 and the iSCSI target 401 on the storage 400 is never even carried out and there is no flow entry for the iSCSI communication in the OFSs 201 to 204.

Step (1)

The iSCSI initiator of the server apparatus 100 notifies the initiator name 503 and the target name 505 to the storage managing apparatus 300 through the OFS 201.

Step (2)

In the storage managing apparatus 300, "10" as the management ID 500 is assigned to the initiator name 503 and the target name 505. The storage managing apparatus 300 stores the initiator name 503 and the target name 504 which have been notified at step (1), in the storage management table. The storage managing apparatus 300 notifies the management ID 500 of "10" to the iSCSI initiator of the server apparatus 100.

Step (3)

The server apparatus 100 sets the management ID 500 of "10" which has been notified from the storage managing apparatus 300 at step (2), to the destination port number of the iSCSI communication packet.

Step (4)

Figure 4:
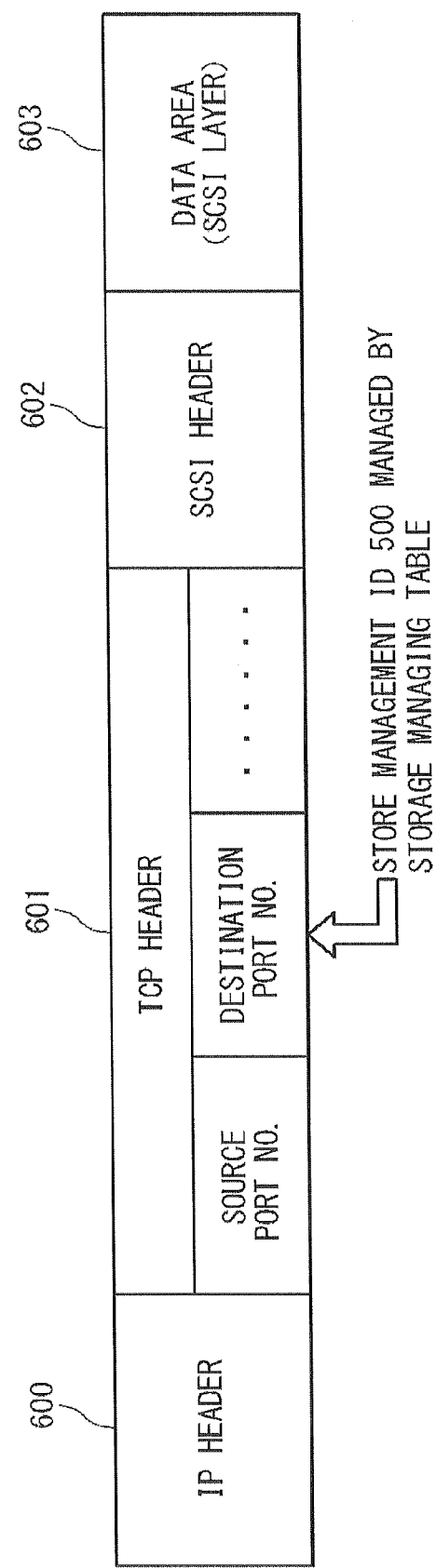
FIG. 4 is a diagram showing a position where a management ID 500 is stored in the iSCSI communication packet transmitted from an iSCSI initiator to an iSCSI target in the communication system 1 according to the exemplary embodiment of the present invention.

The server apparatus 100 sets "10" in the field of the destination port number and transmits the packet of FIG. 4. FIG. 4 is a diagram showing the position in which the management ID 500 is stored, in the iSCSI communication packet transmitted from the iSCSI initiator to the iSCSI target in the communication system 1 according to the present exemplary embodiment of the present invention. In an example of FIG.

4, the management ID 500 is stored in the field of the destination port number of a TCP header 601 of the iSCSI communication packet transmitted to the iSCSI target from the iSCSI initiator.

Step (5)

The OFS 201 refers to the iSCSI communication packet transmitted from the server apparatus 100 at step (4). The OFS 201 transfers the iSCSI communication packet to the OFC 200 through the communication path 205 for the flow control when any flow entry to transfer the iSCSI communication packet does not exist. In an example of this procedure, it is supposed that the iSCSI communication between the iSCSI initiator on the server apparatus 100 and the iSCSI target 401 on the storage 400 is never even carried out and any flow entry for the iSCSI communication does not exist in the OFSs 201 to 204. Therefore, the OFS 201 transfers the iSCSI communication packet to the OFC 200 through the communication path 205 for the flow control.

Step (6)

The OFC 200 notifies a destination port number (management ID 500), a source IP address (the initiator IP address) and a source port number (the initiator port number) which are set in the iSCSI communication packet received at step (5), to the storage managing apparatus 300 through the communication path 221.

Step (7)

The storage managing apparatus 300 refers to the field of destination port number (management ID 500) of the TCP header 601 and the storage management table of FIG. 2 and searches an entry which contains the management ID 500. The storage managing apparatus 300 stores data (the source IP address, and the source port number) in the iSCSI communication packet notified at step (6), in the fields of the initiator IP address 501 and the initiator port number 502 in the entry searched from the storage management table. The storage managing apparatus 300 notifies the destination port number of "3260" and the target connection port 506 of (203-4) to the OFC 200.

Step (8)

The OFC 200 writes into the flow tables of the OFSs 201 to 204, entries defining an action of rewriting the destination port number of the iSCSI communication packet transmitted from the server apparatus 100 from "10" to "3260" and a rule of prescribing the output port 203-4 of the OFS 203 as a destination in the iSCSI communication.

Step (9)

The OFS 201 transfers the iSCSI communication packet to the OFS 203 according to the rule (transferring the iSCSI communication packet transmitted from the server apparatus 100 to the port 203-4 of the OFS 203) and the action (rewriting the destination port number of the iSCSI communication packet transmitted from the server apparatus 100 from "10" to "3260") in the flow entry.

Step (10)

The OFS 203 transmits the iSCSI communication packet received from the OFS 201 to the target 401 of the storage 400 through the port 203-4 of the OFS 203.

Step (11)

The target 401 on the storage 400 receiving the iSCSI communication packet transmitted from the server apparatus 100 carries out processing of an SCSI command taken out from the iSCSI communication packet. The target 401 transmits an iSCSI communication packet (a response packet to the iSCSI communication packet transmitted from the server apparatus 100) for the iSCSI initiator of the server apparatus 100.

Step (12)

The OFS 203 refers to the response packet transmitted from the target 401 at step (11). The OFS 203 transfers the response packet to the OFC 200 if any flow entry for processing the response packet does not exist. In an example of this procedure, because the OFS 203 never transmits the response packet even once, the flow entry for processing the response packet does not exist. Therefore, the OFS 203 transfers the response packet to the OFC 200.

Step (13)

The OFC 200 notifies a destination IP address (the initiator IP address) and a destination port number (the initiator port number) in the response packet transmitted from the target 401 at step (11), to the storage managing apparatus 300 through the communication path 221.

Step (14)

The storage managing apparatus 300 refers to the storage management table of FIG. 2 based on the destination IP address (the initiator IP address) and the destination port number (the initiator port number), to search a corresponding entry. The storage managing apparatus 300 notifies the management ID 500 ("10") of the searched entry to the OFC 200.

Step (15)

The OFC 200 writes an entry which prescribes an action to rewrite the destination port number of the response packet transmitted from the storage 400 from "3260" to "10" and a rule to specify a destination of the response packet to the output port 201-1 of the OFS 201, in the flow tables of the OFSs 201 to 204.

Step (16)

Figure 5:
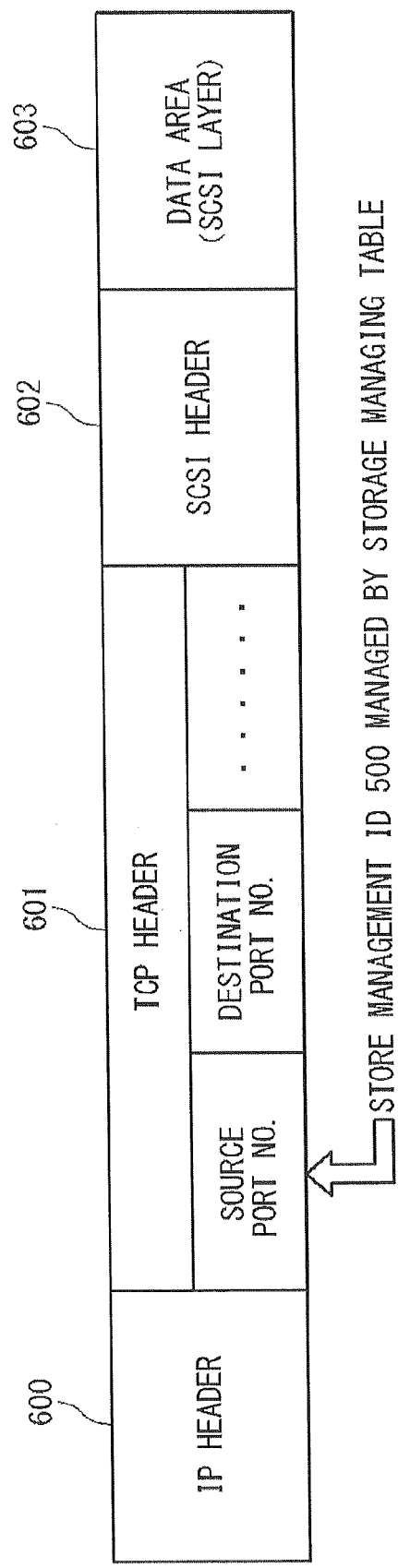
FIG. 5 is a diagram showing the position where management ID 500 is stored in a response packet transmitted from the iSCSI target to the iSCSI initiator in the communication system 1 according to the exemplary embodiment of the present invention.

The OFS 203 transfers the response packet to the OFS 201 according to the rule (transferring the response packet transmitted from the storage 400 to the port 201-1 of the OFS 201) and the action (rewriting the source port number of the response packet transmitted from the storage 400 from "3260" to "10") of the flow entry. FIG. 5 is a diagram showing a position of the management ID 500 stored in the response packet transmitted from the iSCSI target to the iSCSI initiator in the communication system 1 according to the exemplary embodiment of the present invention. The management ID 500 is stored in the field of a source port number of the TCP header 601 of the response packet transmitted from the iSCSI target to the iSCSI initiator.

Step (17)

The OFS 201 transmits the response packet received from the OFS 203 to the iSCSI initiator of the server apparatus 100 through the port 201-1 of the OFS 201.

Step (18)

Then, the iSCSI communication packet transferred from the iSCSI initiator of the server apparatus 100 is transferred according to the flow entries of the OFSs 201 to 204. Because there are entries in the flow tables of the OFSs 201 to 204 already, the packet transfer to the OFC 200 is not carried out.

Step (19)

The response packet transferred from the target 401 of the storage 400 is transferred according to the flow entries of the OFSs 201 to 204. Because there are the entries in the flow tables of the OFSs 201 to 204 already, the packet transfer to the OFC 200 is not carried out.

In the present exemplary embodiment, the management ID 500 is stored in the destination port number of the TCP header for the flow control without storing the iSCSI name in an option area of the TCP header. Therefore, in the packet processes of the OFSs 201 to 204, a vendor extension operation becomes unnecessary so that the high-speed switching becomes possible.

Also, in the present exemplary embodiment, by storing the iSCSI name in an option field of the TCP header, the iSCSI communication packet is identified based on the management ID 500 stored in the field of destination port number of the TCP header without identifying the iSCSI communication packet. Therefore, the flow control in which the data size of the packet is suppressed becomes possible.

Also, in the present exemplary embodiment, the management ID 500 is determined based on the iSCSI initiator name 503 and the iSCSI target name 505. Because the IP address set individually to the iSCSI target is not used to determine the management ID 500, the storage 400 having a scalable configuration can be realized. In the present exemplary embodiment, even if a target is added to the storage 400 according to need, the flow can be controlled based on the identical management ID 500 if there is no change of the iSCSI name.

In the present exemplary embodiment, a same IP address is set to all of the iSCSI targets. However, even in case that an individual IP address is set to each of the iSCSI targets, the present invention can be implemented. In this case, the iSCSI initiator transmits a packet by setting a virtual IP address set to the whole storage 400 to the destination IP address. The OFSs 201 to 204 rewrites the destination IP address to an IP address for every target at the same time as rewriting the destination port number. Also, in the same way, regarding to the response packet from the target, the OFSs 201 to 204 rewrite the source IP address to the virtual IP address set to the whole storage 400 when rewriting the source port number.

As described above, the exemplary embodiments of the present invention have been described with reference to the drawings. However, the present invention is not limited to the above-mentioned exemplary embodiments, and can be appropriately modified by a person skilled in the art so as not to deviate from the spirit of the present invention.

It should be noted that this patent application claims a priority on convention based on Japanese Patent Application JP 2011-134425. The disclosure thereof is incorporated herein by reference.

The invention claimed is:

1. A communication system comprising:
   a server apparatus comprising an Internet Small Computer System Interface (iSCSI) initiator;
   a storage device comprising an iSCSI target;
   a storage managing apparatus configured to manage the storage;
   an open flow controller configured to control open flow switches; and
   the open flow switches configured to transfer a packet,
   wherein the storage managing apparatus stores a route data of an iSCSI communication packet for every management identifier (ID) which is determined based on an iSCSI initiator name and an iSCSI target name,
   wherein the server apparatus transmits the iSCSI communication packet in which the management ID is set in a field of a destination port number of a TCP header, to the open flow switches,
   wherein the open flow switches transfer the iSCSI communication packet to the open flow controller, when any entry to process the iSCSI communication packet does not exist in flow tables, and transfer the iSCSI communication packet based on entries when the entries to process the iSCSI communication packet exist in the flow tables, and
   wherein the open flow controller inquires the route data corresponding to the management ID to the storage managing apparatus when receiving the iSCSI communication packet, generates the entries to transfer the iSCSI communication packet, and distributes the entries to the open flow switches.

2. The communication system according to claim 1, wherein, when not holding the management ID, the server apparatus transmits the iSCSI initiator name and the iSCSI target name to the storage managing apparatus, before transmitting the iSCSI communication packet, and wherein the storage managing apparatus allocates the management ID based on the iSCSI initiator name and the iSCSI target name and transmits the management ID to the server apparatus.

3. The communication system according to claim 1, wherein an entry to transfer the iSCSI communication packet transmitted from the server apparatus has an action to rewrite the management ID stored in the field of the destination port number of the TCP header to a port number used by the iSCSI target, and wherein the entry to transfer the iSCSI communication packet transmitted from the storage transmits has an action to rewrite a source port number of the TCP header to the management ID.

4. A communication method in a communication system which comprises:
   a server apparatus comprising an iSCSI initiator;
   a storage device comprising an iSCSI target;
   a storage managing apparatus configured to manage the storage;
   an open flow controller configured to control open flow switches; and
   the open flow switches configured to transfer a packet,
   said communication method comprising:
   storing by the storage managing apparatus, a route data of an iSCSI communication packet for every management ID which is determined based on an iSCSI initiator name and an iSCSI target name;
   storing by the server apparatus, the management ID in a field of a destination port number of a TCP header;
   transmitting by the server apparatus, the iSCSI communication packet in which the management ID is stored, to the open flow switch;
   transferring by the open flow switch, the iSCSI communication packet to the open flow controller when any entry to process the iSCSI communication packet does not exist in a flow table;
   transferring by the open flow switch, the iSCSI communication packet based on an entry when the entry to process the iSCSI communication packet exists in the flow table;
   inquiring by the open flow controller, the route data corresponding to the management ID to the storage managing apparatus when receiving the iSCSI communication packet;
   generating by the open flow controller, entries to transfer the iSCSI communication packet based on a result of inquiring to the storage managing apparatus; and
   distributing by the open flow controller, the entries to the open flow switches.

5. The communication method according to claim 4, further comprising:
   transmitting by the server apparatus, the iSCSI initiator name and the iSCSI target name to the storage managing apparatus before transmitting the iSCSI communication packet when not holding the management ID; and
   allocating by the storage managing apparatus, the management ID based on the iSCSI initiator name and the iSCSI target name; and
   transmitting the management ID to the server apparatus by the storage managing apparatus.

6. The communication method according to claim 4, further comprising:

rewriting the management ID stored in a destination port number of a TCP header into a port number used by the iSCSI target in the iSCSI communication packet transmitted from the server apparatus; and rewriting a source port number of the TCP header to the management ID in the iSCSI communication packet transmitted from the storage.

\* \* \* \* \*